US006970098B1

(12) United States Patent
Adams et al.

(10) Patent No.: US 6,970,098 B1
(45) Date of Patent: Nov. 29, 2005

(54) SMART BIOMETRIC REMOTE CONTROL WITH TELEPHONY INTEGRATION METHOD

(75) Inventors: Aditha M. Adams, Seattle, WA (US); Adrian M. Chandley, Sammamish, WA (US); Carl J. Ledbetter, Mercer Island, WA (US); Dale C. Crosier, Kirkland, WA (US); Justin M. Maguire, Seattle, WA (US); Pasquale DeMaio, Bellevue, WA (US); Scott A. Manchester, Redmond, WA (US); Taryn K. Beck, Seattle, WA (US); Steven T. Kaneko, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 7 days.

(21) Appl. No.: 10/941,302

(22) Filed: Sep. 15, 2004

Related U.S. Application Data

(63) Continuation of application No. 10/919,023, filed on Aug. 16, 2004.

(51) Int. Cl.[7] ......................... G08C 19/00; H04N 7/16; H04N 7/173; H04M 11/00

(52) U.S. Cl. ........................... 340/825.69; 340/825.72; 340/5.82; 348/734

(58) Field of Search ...................... 340/825.69, 825.72, 340/5.82, 5.83, 5.84; 382/124; 348/161, 348/734

(56) References Cited

U.S. PATENT DOCUMENTS

| | | | | |
|---|---|---|---|---|
| 5,414,773 | A * | 5/1995 | Handelman | 348/481 |
| 5,835,126 | A * | 11/1998 | Lewis | 725/83 |
| 2002/0085128 | A1 * | 7/2002 | Stefanik | 348/734 |
| 2002/0095587 | A1 | 7/2002 | Doyle et al. | |
| 2003/0122876 | A1 * | 7/2003 | Berlad et al. | 345/773 |
| 2003/0172283 | A1 * | 9/2003 | O'Hara | 713/186 |
| 2004/0091236 | A1 | 5/2004 | Boston et al. | |
| 2004/0148632 | A1 * | 7/2004 | Park et al. | 348/734 |

FOREIGN PATENT DOCUMENTS

| | | | | |
|---|---|---|---|---|
| GB | 2388941 A | * 11/2003 | | A61B 5/117 |
| WO | WO 3053060 A1 | * 6/2003 | | H04N 7/173 |

OTHER PUBLICATIONS

Espinosa-Duró, V., "Minutiae Detection Algorithm for Fingerprint Recognition," *IEEE AESS Sys. Mag. 17*(3):Mar. 7-10, 2002.

Espinosa-Duró, V., "Minutiae Detection Algorithm for Fingerprint Recognition," *IEEE Ann Intl. Carnahan Conf. on Sec. Tech. Proc.*, pp. 264-266, 2001.

Rahman, M., and P. Bhattacharya, "Remote Access and Networked Appliance Control Using Biometrics Features," *IEEE Trans. Cons. Elec. 49*(2):348-353, May 2003.

* cited by examiner

*Primary Examiner*—Brian Zimmerman
*Assistant Examiner*—Clara Yang
(74) *Attorney, Agent, or Firm*—Christensen O'Connor Johnson Kindness PLLC

(57) ABSTRACT

A handheld remote control device for a Media Computing Device has a biometric sensor to authenticate a user. The handheld remote control device includes a microphone and speaker to enable integration of a telephony system with the Media Computing Device. The handheld remote control device can be used as the interface with the Media Computing Device, alternatively, the handheld remote control device can be used as a speakerphone for communication in a telephony system that is integrated with the Media Computing Device. A multifunctional handheld remote control device can implement a variety of routines for interfacing with the Media Computing Device or alternatively for communicating in the telephony system.

1 Claim, 6 Drawing Sheets

SMART BIOMETRIC REMOTE CONTROL WITH TELEPHONY INTEGRATION METHOD

CROSS-REFERENCE TO RELATED APPLICATION

This application is a continuation of application Ser. No. 10/919,023, filed Aug. 16, 2004, incorporated herein by reference.

FIELD OF THE INVENTION

The present invention relates to a handheld remote control device with a biometric sensor, and to a system, method and apparatus for remotely controlling a Media Computing Device.

BACKGROUND OF THE INVENTION

In recent years, the use of computing devices has made the integration of a plurality of media components into a single entertainment center possible, providing users with a multitude of media choices. For example, a computing device for an entertainment center may include any combination of an amplitude modulated (AM) receiver, a frequency modulated (FM) receiver, a compact disc (CD) player, a digital video disc (DVD) player, and a television (TV) tuner. Other audio/visual components may also be included in the entertainment center. Such entertainment centers can be located in a home wherein a multitude of users will want to have access to the entertainment center. With the digitization of many forms of entertainment media and the availability of vast amounts of files that have been digitized, the creation of personalized lists for each specific user is possible with a computing device. The entertainment center is desirably controllable from a location that is remote to the entertainment center to avoid the necessity of staying within reach of the buttons on the entertainment center.

Nearly all entertainment audio and video components come with a remote control to remotely control the audio or video device. Each device usually comes with its own remote control, and the accumulation of remote controls can lead to frustration in trying to find the correct remote control for the device that is desired to be controlled. The problem is further compounded if the user is in the process of enjoying the entertainment device when the phone rings. If the phone is not within reach, the user will have to get up to answer the phone and will also be trying to locate the correct remote control to lower the volume on the entertainment device. The entertainment experience is further diminished if the user was watching a live TV show and will have to miss a portion of the show if he or she cannot risk missing the call to first operate a recording device. Accordingly, it would be advantageous to the user to have a multifunctional handheld remote control that can control any audio, video, or Media Computing Device, wherein the handheld remote control device can also be used as a telephone handset or speakerphone for communicating.

A user of the entertainment center would further benefit from the entertainment center being able to authenticate the current user and thus be able to provide the current user with personalized settings that can include personalized playlists, personal information, favorite movies, favorite songs, etc. In addition to allowing the personalization of the entertainment experience, a computing device can allow the integration of the entertainment center with communication systems, such as email, telephone, facsimile, and the like. With the integration of telephony functionality with entertainment, a need exists for a multifunctional handheld remote control device that can operate the entertainment center components and further serve as a communication device. Furthermore, a need exists for a system, method, and apparatus for allowing an entertainment center and communication system to authenticate a specific user from among a multitude of possible users and thus have the entertainment center and communication system provide customized and personalized functions for the current user.

SUMMARY OF THE INVENTION

According to one aspect of the present invention, a handheld remote control device with a biometric sensor for authenticating a specific user from a multitude of users, wherein the handheld remote control device is used for interfacing with a Media Computing Device, is provided. In addition to the biometric sensor, the remote control includes a plurality of audio/video buttons, numeric keypad buttons, transport buttons, and navigation buttons to control the Media Computing Device and any number of the Media Computing Device audio and visual component devices. A screen disposed on the handheld remote control device is used for interfacing with the Media Computing Device. The handheld remote control device is multifunctional to be capable of interfacing with the Media Computing Device to control entertainment media and to communicate in a telephony system. The handheld remote control device is further provided with a microphone and speaker for communications functionality.

According to another aspect of the present invention, a method is provided for interfacing with a Media Computing Device that uses a handheld remote control device with biometric sensor to authenticate a user and enable the initialization of settings to provide the user with a personalized entertainment experience.

According to another aspect of the present invention, a method is provided for using a handheld remote control device that can control any one or more of several entertainment components, and can additionally function as a telephone handset or speakerphone for communicating in a telephony system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

A computing device having one or more entertainment media components that is integrated with a communication system that provides a user with computing, entertainment and communication functions is referred to herein as the Media Computing Device. A Media Computing Device thus can include a computing device integrated with a combination of audio and video components and a telephony system. For example, a Media Computing Device may include a computing device, and entertainment devices, such as a digital video disc (DVD) player, a compact disc (CD) player and a visual interface, such as a plasma or liquid crystal display (LCD) monitor. Control of the Media Computing Device can occur locally or remotely, such as through a handheld remote control device. The handheld remote control is functional to transmit a signal that can effect a predefined response in one of the entertainment devices above or the Media Computing Device. A handheld remote control device is intended to be operated from a location that is remote from the Media Computing Device so that no physical connection is established between the Media Computing Device and the handheld remote control device. A handheld remote control device is intended to be easily carried from place to place, and is generally, out of convenience, operated while in the hand of the user. Generally, the handheld remote control device can rest in the palm of the hand, and the buttons can be operated with the thumb. In certain implementations of the handheld remote control device, however, the handheld remote control device can be integrated within a larger device, such as a desktop or laptop personal computer (PC). In such implementation of the handheld remote control device, the device may not be recognizable as a discrete unit, however, many if not all of the functionalities of the handheld remote control device will also be present in the desktop or laptop PC. Therefore, any device having the functionalities described below characteristic of the handheld remote control device will be by definition, include a handheld remote control device.

Figure 1:
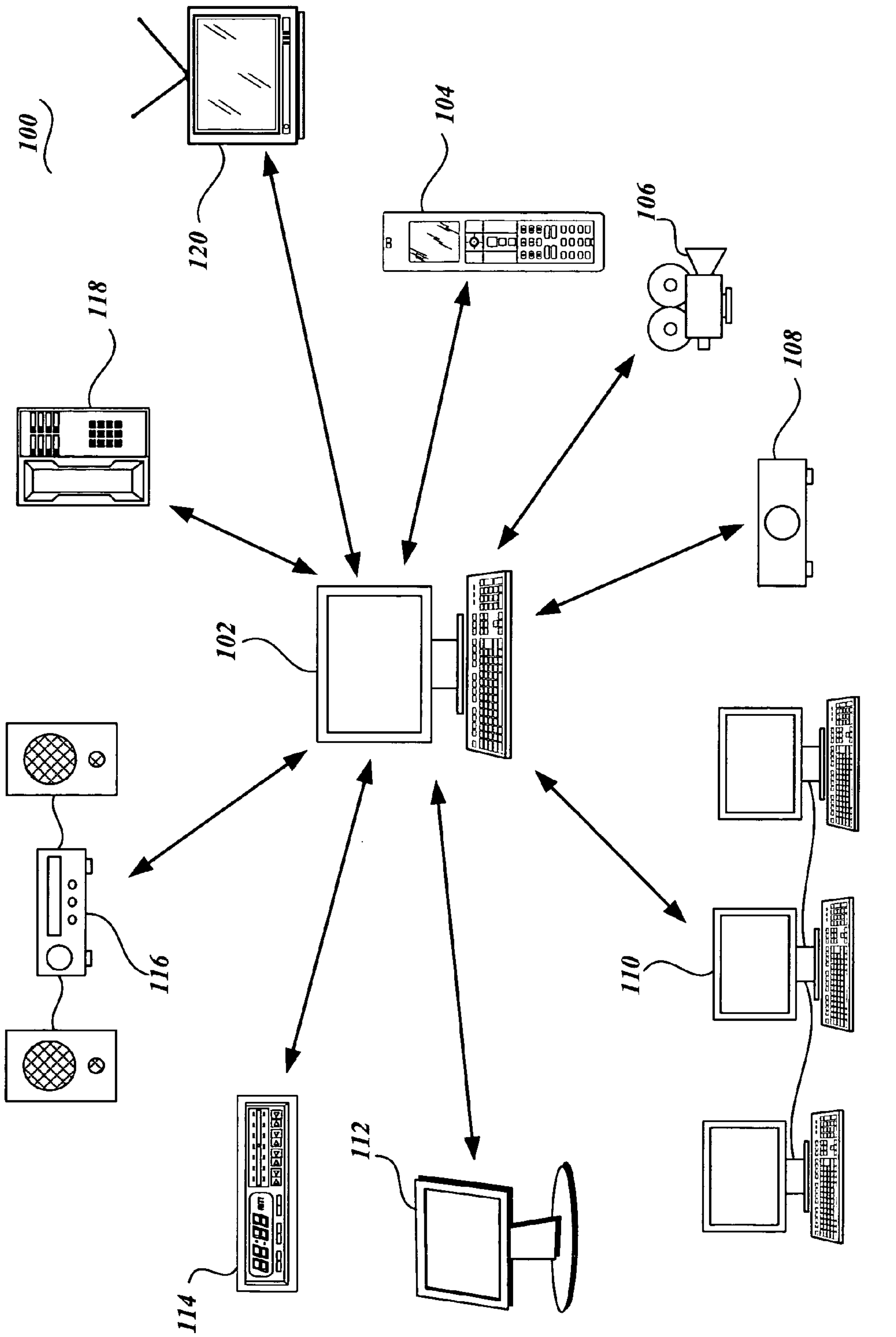
FIG. 1 is an illustration of a representative operating environment for the handheld remote control device according to the present invention.

FIG. 1 illustrates a representative operating environment 100 in which the invention may be implemented. The operating environment 100 is only one example of one operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, mini-computers, mainframe computers, distributed computing environments that include any of the above systems or devices, and the like.

A representative operating environment for the invention includes the Media Computing Device 102. The Media Computing Device 102 is controllable with the handheld remote control device 104. A user interfaces with the Media Computing Device 102 through a display on the handheld remote control device 104, an Auxiliary Display 112, or from a display on the Media Computing Device 102. Included with one implementation of the Media Computing Device 102 is a movie projector 106, a slide projector 108, a web browser for communicating in a distributed computing system 110, an Auxiliary Display 112, a DVD player 114, an AM/FM tuner and speaker system 116, a telephone 118, and a television tuner and speaker 120. Other well-known audio, video and communication components that can be included in the Media Computing Device 102 will be apparent to those skilled in the art.

Media Computing Device 102 typically includes at least some form of computer-readable media. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory, or other memory technology, CD-ROM, digital versatile disks (digital videodisc) (DVD) or other optical storage, magnetic cassettes, magnetic tape, magnetic disk storage or other magnetic storage devices, or any other medium which can be used to store the desired information. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer-readable media.

The Media Computing Device 102, in its most basic configuration, typically includes a processing unit and memory. Depending on the exact configuration and type of computing device, the memory may be volatile (such as RAM), non-volatile (such as ROM, flash memory, etc.) or some combination of the two. Additionally, the Media Computing Device 102 may also have mass storage (removable and/or non-removable) such as magnetic or optical disks or tape. Similarly, the Media Computing Device 102 may also have input devices such as a keyboard, mouse, touch sensitive display and/or output devices such as a display printer and speakers. Other aspects of Media Computing Device 102 may include network connections or other devices, computers, networks, servers, etc., using either wired or wireless media. All of these devices are well known in the art and need not be discussed at length here.

Figure 2:
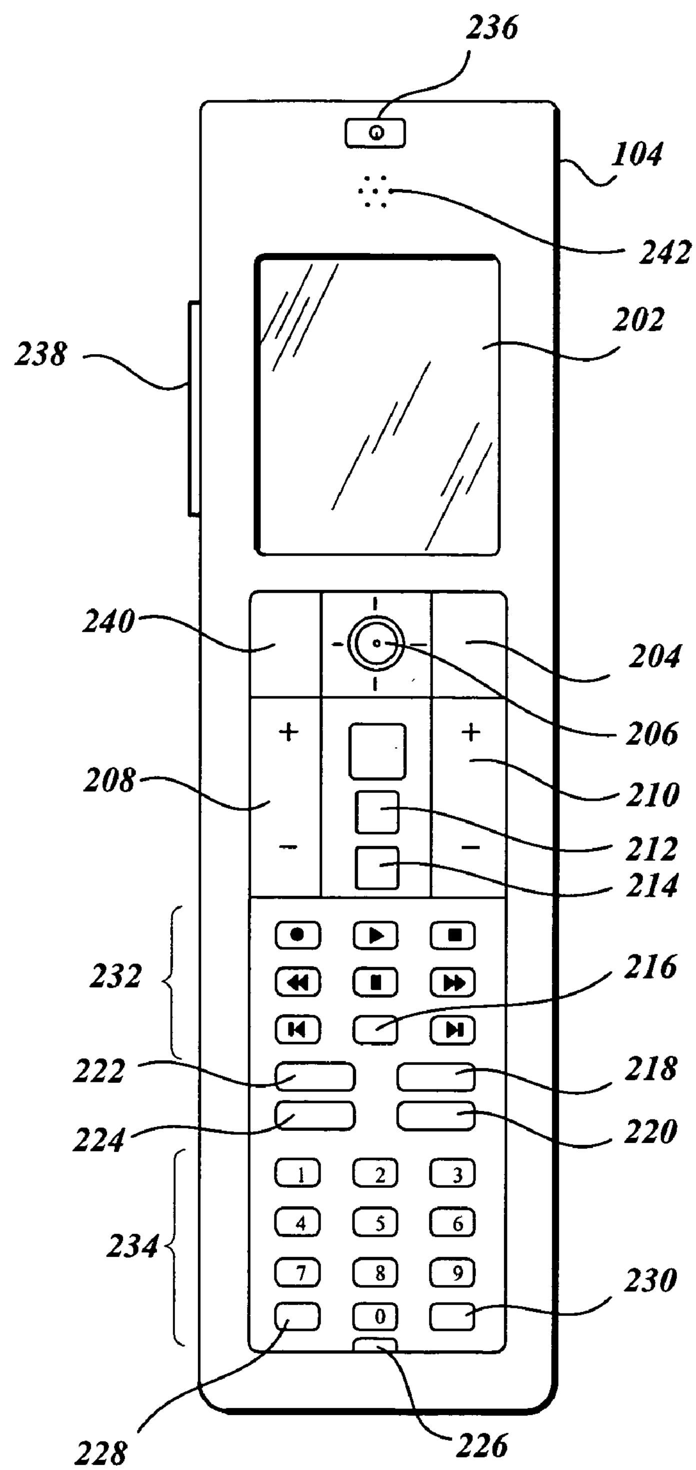
FIG. 2 is an illustration of a representative handheld remote control device according to the present invention.

Referring now to FIG. 2, the handheld remote control device 104 that is functional to interface with and control the Media Computing Device 102 of FIG. 1, is illustrated. The handheld remote control device 104 is designed to provide a user with the ability to interact with the Media Computing Device 102 and any audio/video devices from a location that is remote from the Media Computing Device 102. The handheld remote control device 104 includes a display 202, capable of showing images and text for use as the interface between the user and the Media Computing Device 102. The display 202 can be a liquid crystal display. The handheld remote control device 104 has a plurality of buttons for selection and actuation by a user. Actuation of the buttons will generate a signal that is transmitted from the handheld remote control device 104, wherein the signal will be received and processed by the Media Computing Device 102 to effect a predetermined function of the Media Computing Device 102. Transmission of signals for interfacing electronic devices is known in the art and will not be discussed in detail herein. For example, the signal that is generated by the handheld remote control device 104 may be transmitted wirelessly and/or via an infrared signal.

The Media Computing Device 102, in response to receiving a signal from the handheld remote control device 104, generates a preprogrammed response. A response may be any variety of response from powering up the Media Computing Device 102, displaying a user defined shortcut screen on the Auxiliary Display 112, to placing the Media Computing Device 102 in standby mode.

The handheld remote control device buttons are generally categorized into four functional areas, including navigation, transport control, audio and video control, and numeric control. The description provided herein of the buttons of the handheld remote control device 104 being actuated by a user is representative of one implementation of the buttons and is not intended to be limiting. In alternative embodiments, the buttons may be displayed electronically for interaction by a user. For example, buttons may be displayed on a touch sensitive display and the user can interact with the touch sensitive display.

The navigational button 206 enables a user to invoke and interact with the interface display of the Media Computing Device 102, the Auxiliary Display 112, or the handheld remote control device 104. The interface may be based on a focus point that can be moved around the interface display. The navigational button 206 can be pivoted about a central point to move the focus in a four-way manner, up or down and forward or back. When the focus is highlighting the desired item, the navigational button 206 also includes an OK button that may be actuated by depressing the center of the navigational button 206 instructing the Media Computing Device 102 to carry out the selection. The positioning of the focus, followed by activation, can carry out the operation that is selected. Other navigational buttons may include a backspace button 240, a more information button 204, a guide button 220, a recorded TV button 222, a live TV button 218, and a DVD menu button 224.

A first actuation by a user of a Start button 236 generates a signal that instructs the Media Computing Device 102 to display a Media Computing Device home page, and if the Media Computing Device 102 is not currently running, to start the Media Computing Device 102. Actuation of the Start button 236 results in the display of the Media Computing Device 102 home page regardless of what interaction is currently being provided to the user. For example, if a user is watching a movie stored on a DVD, actuation of the Start button 236 will display the home page of the Media Computing Device 102 on the interface.

Actuation of the upper portion of the navigational button 206 by a user generates from the handheld remote control device 104, a signal that instructs the Media Computing Device 102 to move the focus point on the interface up one location from its previous position, and if at the top of the interface display to take no action. Alternatively, if the focus point is at the top of the interface display, the Media Computing Device 102 may move the focus point to the bottom of the interface display. This button may also be programmed to "auto-repeat" the action of moving the focus point up one location on an interface display. "Auto-repeat," as used herein, is the generation of the same signal numerous times in response to a user continuously holding down a particular button. Actuation of the lower portion of navigational button 206 moves the focus point on an interface display down one location. If the focus point is at the bottom of the interface display, actuation of the lower portion of the navigational button 206 will result in no action. In an alternative embodiment, if the focus point is at the bottom of the interface display, selection of the lower portion of the navigational button 305 may generate a signal to instruct the Media Computing Device 102 to move the focus point to the top of the interface display. Actuation of the lower portion of the navigational button 206 may also include an auto-repeat feature. The left portion of the navigational button 206, upon actuation, generates a signal to move the focus point on the interface display left one position. If the focus point on the interface display is at the leftmost position, selection of left portion of the navigational button 206 generates a signal instructing the Media Computing Device 102 to go back one page in the interface display stack. The left portion of the navigational button 206 may also be programmed to auto-repeat the signal. The right portion of the navigational button 206, upon actuation, generates a signal to the Media Computing Device 102 to move the focus point on the interface display one position to the right, and if at the rightmost position to take no action. The right portion of the navigational button 206 may also be programmed for auto-repeat.

The OK portion of the navigational button 206, upon actuation, generates a signal instructing the Media Computing Device 102 to perform the action indicated on the interface display by the focus point.

The Back button 240, upon actuation by a user, generates a signal from the handheld remote control device to instruct the Media Computing Device 102 to go back one location in the interface display stack.

An Information button 204, upon actuation by a user, generates a signal instructing the Media Computing Device 102 to provide information on the interface display, if available, for the current focus point displayed on the interface display. A second press of the Information button 204 generates a signal to the Media Computing Device 102 to clear the information provided on the interface display.

A Guide button 220, upon actuation by a user, generates a signal from the handheld remote control device 104 to instruct the Media Computing Device 102 to invoke an Electronic Program Guide ("EPG"). Additionally, upon a second actuation by a user of the Guide button 220, a signal is generated instructing the handheld remote control device 104 to cycle through the guide options presented on the interface display.

The Live TV button 218, upon actuation by a user, generates a signal from the handheld remote control device instructing the Media Computing Device 102 to bring live TV to the front of the interface display and display the last channel the user was watching.

The handheld remote control device 104 includes a Recorded TV button 222. The Recorded TV button 222, upon actuation by a user, generates a signal from the handheld remote control device 104 instructing the Media Computing Device 102 to display a Recorded TV page on the interface. In general, the Recorded TV button 222 acts as a shortcut to a user-created Recorded TV page.

Additionally, the handheld remote control device 104 may include a DVD menu button 224. Actuation of the DVD menu button 224 generates a signal from the handheld remote control device 104 instructing the Media Computing Device 102 to display a DVD menu page on the interface.

Referring still to FIG. 2, the handheld remote control device 104 includes a plurality of transport control buttons, collectively numbered 232. "Transport control," in general, relates to the options for a CD or DVD player, and the like. Included in the transport control buttons is a Play button, Pause button, Stop button, Record button, Fast Forward button, Rewind button, Skip Forward button, and Replay button.

Actuation by a user of a Play button generates a signal from the handheld remote control device 104 instructing the Media Computing Device 102 to start (if paused, to continue) playback of media at a present position pointer. Actuation by a user of the Pause button generates a signal from the handheld remote control device 104 instructing the Media Computing Device 102 to pause the playback of media at a present position. Continued actuation of the Pause button generates signals to the Media Computing Device 102 to toggle the pause state between pause and continue playback at a present position pointer. Actuation of the Stop button generates a signal from the handheld remote control device 104 instructing the Media Computing Device 102 to stop media playback.

In one embodiment of the present invention, actuation of the Stop button generates a signal instructing the Media Computing Device 102 to stop media playback and to return the position pointer to the start of the media. Alternatively, the Media Computing Device 102 may leave the position pointer at the location in the media where the stop signal was received.

Actuation of the Record button generates a signal from the handheld remote control device 104 instructing the Media Computing Device 102 to record media to a disc. Actuation of the Fast Forward button generates a signal from the handheld remote control device 104 instructing the Media Computing Device 102 to speed up the time base of a media stream to a first fast forward value. If the media is a slide show, actuation of the Fast Forward button instructs the Media Computing Device 102 to skip to the next picture in the slide show.

The first fast forward value may be any multiple of the normal playback speed. For example, the first fast forward value may be three times the normal playback speed of the media. Continued actuation of the Fast Forward button generates signals instructing the Media Computing Device 102 to cycle through the fast forward speed values looping through a normal speed, a first fast forward value, and to any additional fast forward values that are predetermined for the Media Computing Device 102. The predetermined fast forward values may be any multiple of the normal playback speed. Additionally, when the media being presented to a user is a slide show, continued actuation by a user of the Fast Forward button generates signals instructing the Media Computing Device 102 to continue to skip to the next picture in the series of pictures of the slide show.

Actuation of the Rewind button on the handheld remote control device 104 generates a signal from the handheld remote control device 104 instructing the Media Computing Device 102 to speed up the time base and reverse direction of the media stream to a first rewind value. If the media stream is a slide show, actuation of the Rewind button instructs the Media Computing Device 102 to skip to the previous picture in the slide show. A first rewind value may be any multiple of the normal playback speed of a media stream in a reverse direction. For example, the first rewind value may be three times the normal playback speed of a media stream in a reverse direction. Additional actuation by a user of the Rewind button generates signals instructing the Media Computing Device 102 to cycle through the various rewind speed values looping through the normal speed value, the first rewind speed value, and any additional predetermined rewind speed values. Likewise, if the media is a slide show, continued actuation results in the Media Computing Device 102 continuing to skip to the previous picture in the slide show. Predetermined rewind values may be any multiple of the normal playback speed of a media stream in the reverse direction.

Actuation by a user of a Skip Forward button generates a signal from the handheld remote control device 104 instructing the Media Computing Device 102 to skip ahead an increment in the media. For example, if the media being played is music from a CD, actuation of the Skip Forward button results in the Media Computing Device 102 skipping ahead one song in the playlist. If the media is a movie on a DVD, actuation of the Skip Forward button results in the Media Computing Device 102 skipping to the next chapter. If the media is a slide show, the Media Computing Device 102 will skip to the next picture in response to a user actuating the Skip Forward button.

Actuation by a user of a Replay button generates a signal from the handheld remote control device 104 instructing the Media Computing Device 102 to rewind the position pointer one increment and replay that portion of the media. For example, if the media being played is a song from a CD, actuation of the Replay button will result in the Media Computing Device 102 returning to the beginning of the song. If the media is a movie from a DVD, actuation of the Replay button results in the movie returning to the beginning of the chapter being viewed. Likewise, if the media is a slide show, the previous slide is provided in response to actuation of the Replay button.

Referring still to FIG. 2, the handheld remote control device 104 includes audio/video buttons. In particular, the audio/video control buttons may include a Volume button 208, a Channel button 210, and a Mute button 216.

Volume button 208 can be pivoted at the midpoint so that depressing the upper portion thereof can increase the audio signal, while depressing the lower portion of the Volume button 208 can decrease the audio signal. Actuation by a user of the upper portion of the Volume button 208 generates a signal from the handheld remote control device 104 instructing the Media Computing Device 102 to increment the current volume by 1 unit and if the volume is muted to unmute the volume. Actuation of the lower portion of the Volume button 208 generates a signal from the handheld remote control device 104 instructing the Media Computing Device 102 to decrease the current volume by 1 unit, and if muted, to unmute the volume. Volume button 208 may be programmed to auto-repeat if actuated continuously.

The remote control 104 includes Channel button 210 for channel selection. Channel button 210 can alternatively be used to scroll channels and/or other lists such as FM or AM stations, playlists, favorite channel list, favorite movie list and favorite song list. Channel button 210 can be pivoted at the midpoint so that actuating the upper portion thereof can increase the channel by one increment. Alternatively, the lower portion of button 210 can be actuated to decrease the channel by one increment.

Actuation of the upper portion of the Channel button 210 generates a signal from the handheld remote control device 104 to increment the current channel displayed on the interface by 1 item. Actuation of the lower portion of the Channel button 210 generates a signal from the handheld remote control device 104 instructing the Media Computing Device 102 to decrease the current channel displayed on an interface by 1 item. The Channel button 210 may be configured to auto-repeat if actuated continuously.

Actuation by a user of the Mute button 216 generates a signal from the handheld remote control device 104 instructing the Media Computing Device 102 to mute the volume being provided by the Media Computing Device 102. Continuous actuation of the mute button 216 generates signals instructing the Media Computing Device 102 to toggle between a mute and a non-mute state.

Referring still to FIG. 2, the handheld remote control device 104 includes a keypad with numeric buttons collectively denoted as 234 representing each of the numerals from "0" to "9." As is well known to those skilled in the art, numeric keypad buttons 234 operate to generate a signal representing the numeric value assigned to the respective buttons. Additionally, numeric keypad buttons 234 may be actuated to provide alphanumeric input to the Media Computing Device 102. Each of the letters of the alphabet can be assigned to one of the numeric keypad buttons 234. Additionally, the handheld remote control device 104 includes a Clear button 228 and an Enter button 230. Actuation of the Clear button 228 generates a signal from the handheld remote control device 104 instructing the Media Computing Device 102 to delete some, all, or the last entered of the numeric and alphanumeric characters on the interface display. Actuation of the Enter button 230 generates a signal from the handheld remote control device 104 instructing the Media Computing Device 102 to accept the numeric or alphanumeric character string and perform the operation associated with the character string. For example, numeric strings may represent TV channels, the number in a list assigned to song or movie on a playlist, or numeric character strings may represent a telephone number when the handheld remote control is in telephone mode.

Referring still to FIG. 2, the handheld remote control device 104 includes a voice command button 212. Voice command button 212 can have several functionalities as will be described below including the use of the handheld remote control device 104 as a speakerphone or telephone in a telephony system, and for use in issuing voice commands that control the Media Computing Center 102. "Telephony system" as used herein can refer to any implementation of a computer telephony system or a conventional public telephony system and may include the public telephone system, wireless communications (cell phones), email, Internet, etc. Voice command functionality relates to speaking commands rather than actuating a button to control the operation of the Media Computing Device 102 by a signal representative of the spoken command. For example, rather than press a TV channel number, the user can simply say the number, either action will have the same result on the Media Computing Device 102, which is to tune to the entered or spoken TV channel. In addition, voice command button 212 may also establish telephone functionality that relates to the ability to communicate in real time with a caller of a telephony system. To this end, the handheld remote control device 104 includes a microphone 226 and speaker 242.

Handheld remote control device 104 further includes a Do-Not-Disturb button 214. Do-Not-Disturb button 214 may function when actuated, to send a current caller of a telephony system to a voice mailbox. Messages left on the voice mailbox of the user are accessible by the user of the handheld remote control device 104 at the user's discretion, and where the caller records a message, the message can be retrieved at a later time by the user. Further details of the Voice routine of the handheld remote control device 104 will be described in greater detail below.

Referring still to FIG. 2, the handheld remote control device 104 includes a biometric sensor 238. Biometric sensor 238 can determine a user's unique biological characteristic, including, for example, a fingerprint, voice pattern, retina or other facial feature. Recognition of a known biological feature results in the user being authenticated. Authentication refers to a level of increased access to information or customization and personalization of features to the extent specified by the Media Computing Device 102. Biometric sensors are well known devices and need not be described in complete detail herein.

Figure 3:
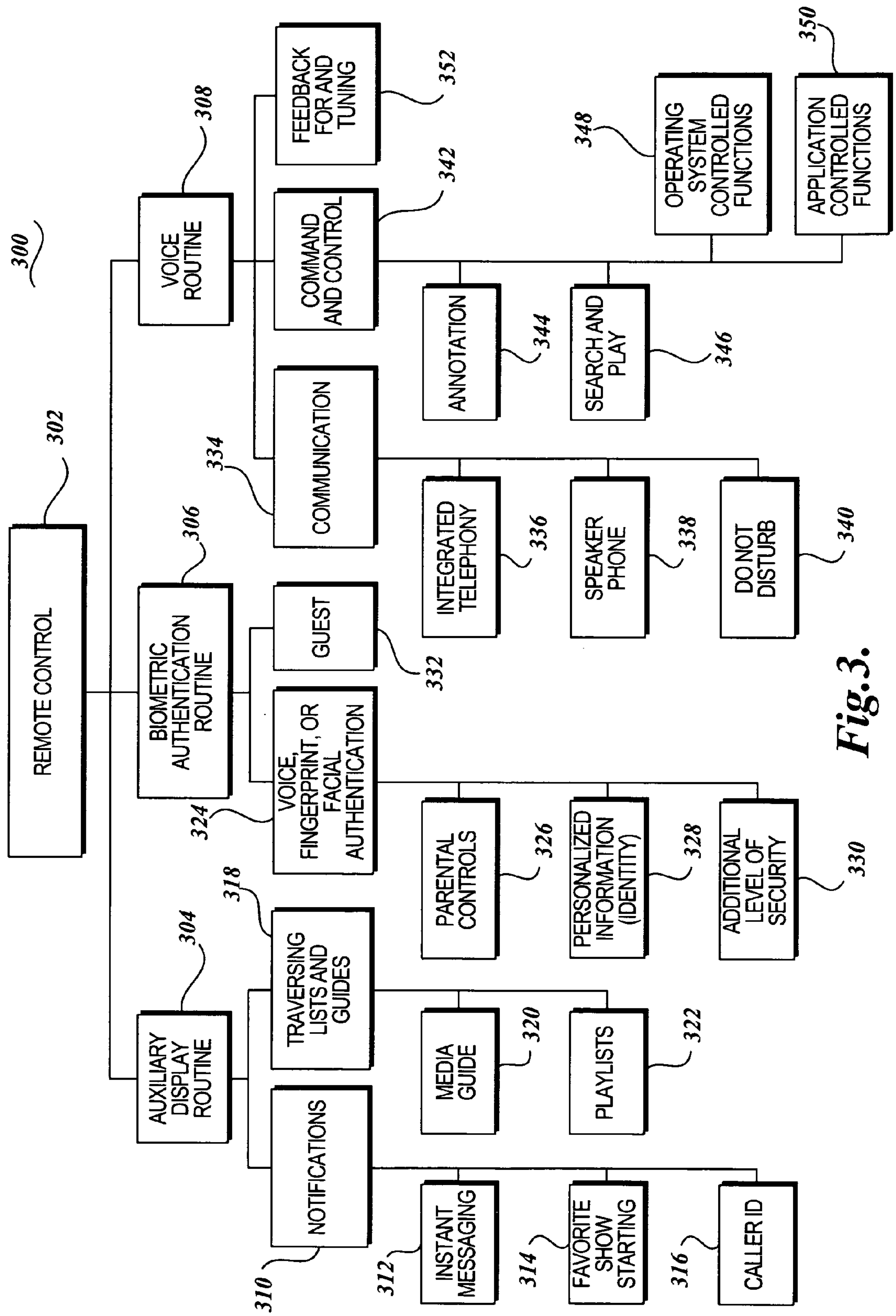
FIG. 3 is a schematic block diagram illustrating the functional aspects of the handheld remote control device according to the present invention.

Having described some of the hardware features of the handheld remote control device 104, the following description relates to the functional aspects of the handheld remote control device 104. Referring now to FIG. 3, a block diagram is illustrated showing representative functional modes of the handheld remote control device illustrated in FIG. 2. Changing from modes may be accomplished via user input, such as through actuation of a button disposed on the handheld remote control device, or through the issuance of a voice command. A multifunctional handheld remote control device 104 has the advantage of minimizing the number of remote controls needed to operate a plurality of entertainment devices, and further has the advantage that telephone functionality is also placed in the handheld remote control device.

As seen in FIG. 3 three representative routines, Auxiliary Display, Biometric Authentication, and Voice, are illustrated that may be implemented with the handheld remote control device 104 according to the present invention. The handheld remote control device 104 is operational to interface with the user during the execution of each of these three routines. While the Auxiliary Display routine, block 304, the Biometric Authentication routine, block 306, and the Voice routine, block 308 are shown as being independent of each other, it is possible that in one or more implementations of the handheld remote control device 104, the Auxiliary Display routine and the Voice routine are dependent on biometric authentication of the user through the handheld remote control device prior to executing either the Auxiliary Display routine or the Voice routine. In other implementations, all three routines may be independent of each other. The handheld remote control device is normally in standby mode in block 302 ready to become operational under a different mode.

The first routine is the Auxiliary Display routine, represented by block 304. An auxiliary display 112 may be incorporated into the handheld remote control device 104 or the auxiliary display 112 may be a stand alone device. The auxiliary display is for interfacing with the user of the handheld remote control device. Notifications can appear on the auxiliary display 112. Alternatively, the auxiliary display 112 can be used for traversing lists and guides. The auxiliary display 112 can be remote from Media Computing Device 102. In a first functional mode, the auxiliary display 112, can be used to display notifications, block 310. Alternatively in a second functional mode, the auxiliary display 112 can be used for traversing lists and guides, block 318. "Notifications" include such information that is transmitted from the Media Computing Device 102 indicating that an event has occurred. For example, Notifications can include Instant Messaging notifications, block 312. Instant Messaging relates to a communication service that can be provided by the Media Computing Device 102 to allow the user to communicate in real time when friends, colleagues, acquaintances, family, and others become available for online communication. An Instant Messaging notification can alert the user that a friend has just come online and is available to receive messages, for example. Notifications may also include Favorite Show Starting notifications, block 314. This notification is transmitted from the Media Computing Device 102 to the auxiliary display 112 to signal that a show, belonging a preselected group of shows that are selected as being desirable for future watching, is beginning. Thus, the user of the handheld remote control device 104 has the opportunity to turn his attention to the auxiliary display 112 and provide the necessary instructions on the handheld remote control device to either watch the show or dismiss the show and continue watching the current show, or whatever activity was current at the time of the notification. Notifications may also include caller identification (caller ID) notifications, block 316. Caller ID refers to the identification of a caller of a telephony system by name, picture or other identifiable sign. A caller ID notification would thus relate to a signal indicating to the user that a caller has requested to communicate with the user. The handheld remote control device 104 can then optionally be converted to function in Voice mode, and the caller can take the call through the handheld remote control device 104 or send the caller to a voice mailbox also through a button functional to activate the Do-Not-Disturb feature.

Operating under the mode of Traversing Lists and Guides, block 318, the auxiliary display 112 can display a media guide, block 320. Media guide, block 320, relates to the any of the various entertainment media components that comprise the Media Computing Device 112. Such media components include but are not limited to entertainment devices, including a movie projector 106, a slide projector 108, a communications network 110, an AM/FM receiver, a DVD player/recorder 114, a CD player 116, a telephone 118, or a television tuner 120. The auxiliary display 112 can display, for example, menus and submenus that a user of the handheld remote control device 104 can navigate through by moving a focus point on the display to select from the various options presented for each of the media components. Additionally to the media guide, playlists, block 320, can be displayed on the auxiliary display 112. Playlists include lists such as favorite CDs, favorite songs, favorite TV shows, favorite DVDs, favorite radio stations, favorite TV channels, and the like. The focus point can move through any of the lists, and when the focus point is highlighting the desired item, the user can actuate a button to select the item. "Favorite" denotes any media item stored in a memory that has been preselected because the media item is likely to be of interest to the user and may be recalled for future reference by the user. From a playlist, the user can select an item with the use of the handheld remote control device 104, instructing the Media Computing Device 102 to play the selected item.

Referring again to FIG. 3, a second routine that can be implemented with the handheld remote control device 102, is the Biometric Authentication routine, block 306. Handheld remote control device 104 is fitted with a biometric sensor 238 for determination of a unique user characteristic that can be used to authenticate a user. "Biometric" as used herein relates to a measurable, individual biological stamp useful to recognize or verify an individual's identity. For example, handheld remote control device 104 can include a sensor to identify one's fingerprint. In block 324, the handheld remote control device 104 with biometric sensor 238 can determine the unique biological feature. The feature is compared with the features of users in a stored location that are permitted to be authenticated. If the user's feature matches with one of those that are registered as being authenticatable, then the user can register on the Media Computing Device 102 as an authenticated user and be granted permissions in accordance with predetermined instructions in the Media Computing Device 102. Alternatively, if the user is not authenticated, the user of the handheld remote control device 104 can interface with the Media Computing Device 102 registered as a guest user, block 332. When registered as a guest user on the Media Computing Device 102, many of the user specific features that are reserved for an authenticated user are not accessible to the guest user.

When a user is determined to be an authenticated user, the Media Computing Device 102 can determine whether parental controls need to be installed, block 326. Such parental controls are installed if the authenticated user is not of a certain age. Parental Controls relates to the blocking access to certain adult material. Additionally to Parental Controls, the Media Computing Device 102 can install certain personalized information based on the identity of the user, block 328. The Media Computing Device 102 can provide an almost limitless number of personalized settings, including but not limited to, favorite shows, favorite songs, favorite CDs, favorite movies, and the like. In general, any likes specific to an authenticated user can be emphasized and incorporated in all interactions with the Media Computing Device 102 and the Media Computing Device components, while any dislikes or unnecessary information may not be displayed. One further aspect related to the Biometric Authentication routine is the higher level of security that biometric authentication can provide to control access to certain features of the Media Computing Device 102. Such higher level security access would not be made available to guests or even users capable of being registered as authenticated other than the user to which the information pertains.

Referring to FIG. 3 again, a third routine implementable on the handheld remote control device 104 is the Voice routine, block 308. The Voice routine is further operational in one of three modes, communication mode, block 334, command and control mode, block 342, or feedback for and tuning mode, block 352. Selection of one of the three modes under the Voice routine can be dependent on one or several automatic or user selectable inputs, for example, the user can actuate a button, such as the Voice Command button described above, or a mode is operational when an outside caller dials the user's telephone number or a mode becomes operational when the user issues a spoken command that is recognized as bringing the Voice routine into the desired operational mode. Communication mode, block 334, includes functionalities that have in common operations related to communication, such as integrated telephony, block 336, speakerphone, block 338, and Do-Not-Disturb, block 340. The second Voice routine mode of Command and Control, block 342, relates to control of the Media Computing Device 102 with the handheld remote control device 104 and includes providing instructions for performing Annotation commands, block 344, Search and Play commands, block 346, operating system controlled function commands, block 348, and application controlled function commands, block 350. Additionally, the third Voice routine mode, block 308, is functional to provide feedback for and tuning, block 352.

Figure 4:
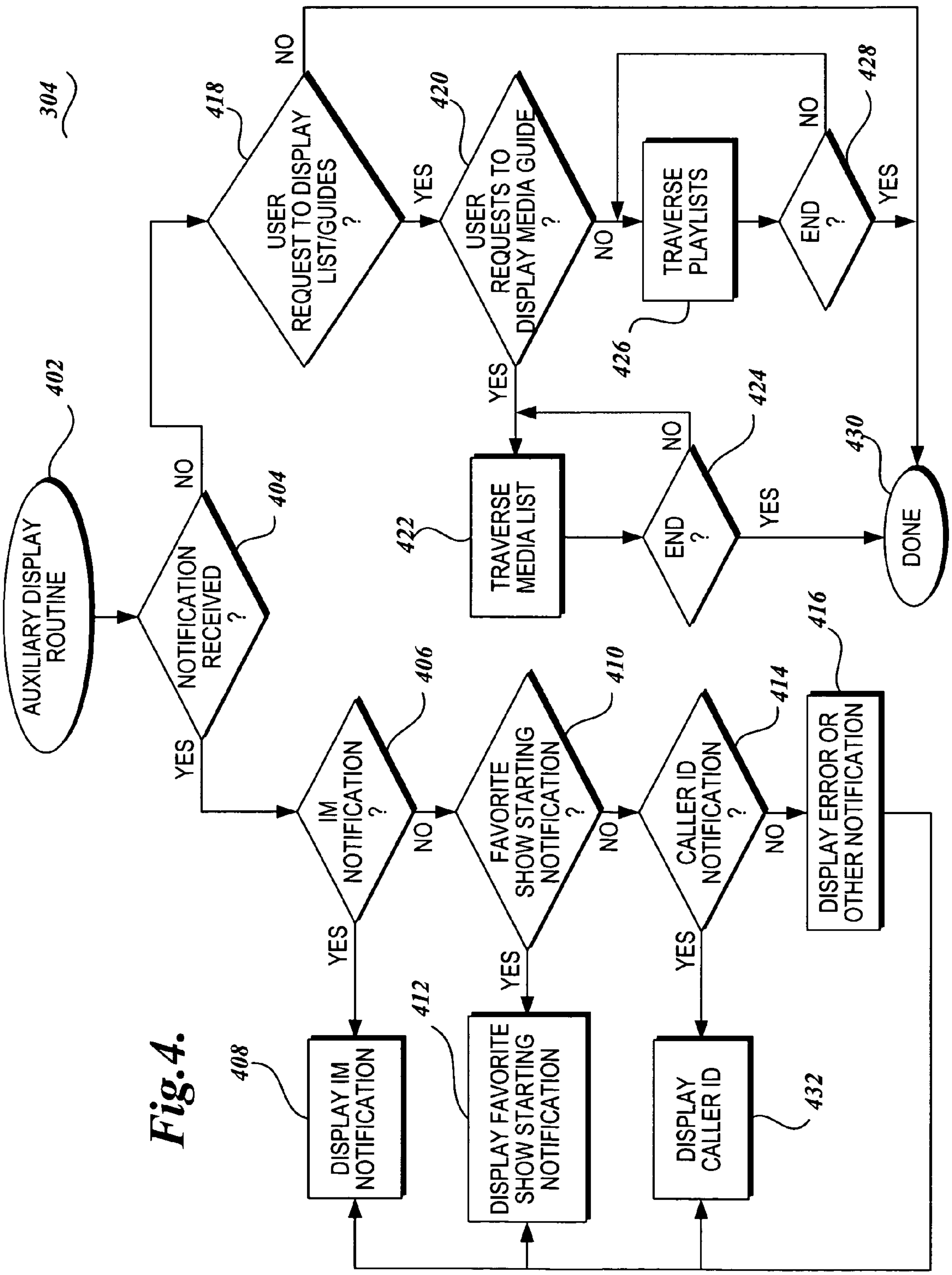
FIG. 4 is a schematic functional flow diagram of the Auxiliary Display routine for a handheld remote control device according to the present invention.

Referring now to FIG. 4, a functional flow diagram of the Auxiliary Display routine 304 for the handheld remote control device 104, is illustrated. Auxiliary Display routine is generally in a standby mode, block 402. The handheld remote control device can be in one of two modes in the Auxiliary Display routine; displaying a notification or displaying a list or guide. The Media Computing Device 102 transmits a signal that is received by the handheld remote control device 104. In block 404, a determination is made whether the signal indicates a notification. If the signal indicates a notification, the Auxiliary Display routine determines whether the notification is an Instant Messaging notification, block 406. If the notification is an Instant Messaging notification, then the auxiliary display 112 displays the Instant Messaging notification, block 408. If the notification is not an Instant Messaging notification, the Auxiliary Display routine determines whether the notification is a Favorite Show Starting notification, block 410. If the notification is a Favorite Show Starting notification, then the auxiliary display 112 displays the Favorite Show Starting notification, block 412. If the notification is not a Favorite Show Starting notification, the Auxiliary Display routine determines whether the notification is a Caller ID notification, block 414. If the notification is a Caller ID notification, the auxiliary display 112 displays the Caller ID notification, block 414. If the notification is not a Caller ID notification, the auxiliary display 112 displays an error or other notification, block 416.

Returning to functional flow diagram block 404, if no signal indicative of a notification is being received, the Auxiliary Display routine determines whether the user has requested to display a list or guide, block 418, by signaling through the handheld remote control device. If the user has requested to display a list or guide, the Auxiliary Display routine determines whether the user has requested to display a media guide, block 420. If the request is to display a media guide, the auxiliary display 112 can be used as the interface with the handheld remote control device 104 to traverse a media list with the use of the handheld remote control device 104. Traversing the media list is continued until the user selects an item from the list, thereafter the Auxiliary Display routine is completed, block 430. Otherwise, the media list continues to be displayed until the desirable item is found, selected and the action is performed.

Returning to block 420 of the functional flow diagram, if the user did not request to display a media guide, the auxiliary display 112 displays a playlist. The user can interface with the playlist using the handheld remote control device 104 until the appropriate item is found, selected, and the action is performed, block 428, otherwise, the user can continue to traverse a playlist until such time as the appropriate item is found. After selection and performance of the action, the Auxiliary Display routine is completed, block 430.

Figure 5:
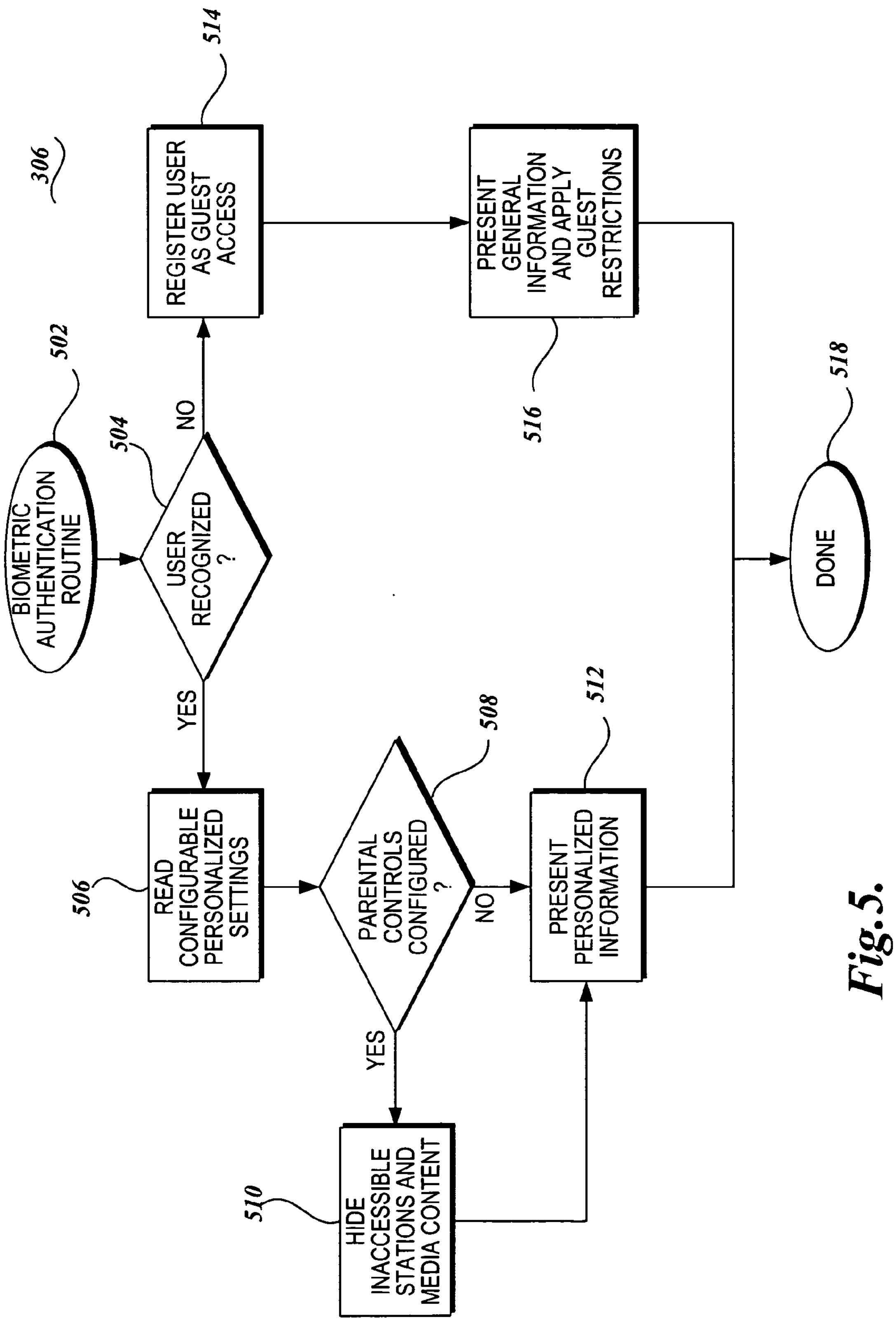
FIG. 5 is a schematic functional flow diagram of the Biometric Authentication routine for a handheld remote control device according to the present invention.

Referring now to FIG. 5, a functional flow diagram of the Biometric Authentication routine 306 for the handheld remote control device 104, is illustrated. Biometric Authentication routine, block 502, is generally in standby mode. Handheld remote control device can be in one of two modes in the Biometric Authentication routine; authenticated user mode and guest user mode. Initialization of the Biometric Authentication routine can occur when a user picks up the handheld remote control device 104. At such time as a user picks up the handheld remote control device 104, the biometric sensor determines whether the user is recognized as having a characteristic belonging to a user that is permitted to be authenticated, block 504. The biometric sensor 238 can be located on the side of the handheld remote control device 104, so that when a user picks up the handheld remote control device 104, the device 104 will be in a position to authenticate the user through recognition of a fingerprint, for example. A signal indicating that the user is authenticated is received, and the handheld remote control device operates in authenticated user mode. If the user is authenticated, a signal is transmitted by the handheld remote control device 104 instructing the Media Computing Device 102 to read the configurable personalized settings, block 506. The configurable personalized settings are specific to the authenticated user. The Biometric Authentication routine can determine whether parental controls need to be configured, for example, by referring to the current date, comparing the current date to the date of birth of the authenticated user, determining the current age of the authenticated user, and determining whether the current age is below the minimum age for parental controls, block 508. If Parental Controls are configured, the Media Computing Device 102 prevents access to certain pages, stations and adult content media, block 510, but otherwise presents personalized information when interfacing with the Media Computing Device 102 through the handheld remote control device, block 512. If parental controls are not configured, the Media Computing Device 102 presents personalized information to the user without otherwise imposing limitations on access to adult content media, block 512, during the course of interfacing with the Media Computing Device 102. The user can remain authenticated for as long as or until a new user becomes authenticated to the Media Computing Device 102, or the current user logs out from the system. Alternatively, more than one user may be simultaneously authenticated.

Returning to block 504, if the Biometric Authentication routine does not authenticate the current user, the handheld remote control device receives a signal indicating that operation of the handheld remote control is in guest user mode. The handheld remote control device sends a signal to the Media Computing Device 102 instructing the Media Computing Device 102 to register the current user as a guest user having only guest privileges and restricts access to guest pages, block 514. In interfacing with the Media Computing Device 102 through the handheld remote control device 104 when registered as a guest user, the Media Computing Device 102 will then present only general information, guest pages, etc., and apply any guest restrictions on the media content. After performing all requested operations by guest user, the Biometric Authentication routine is completed, block 518. A guest user can log out of the system through the handheld remote control device 104, or a new user can log on through initiation of the Biometric Authentication routine.

Figure 6:
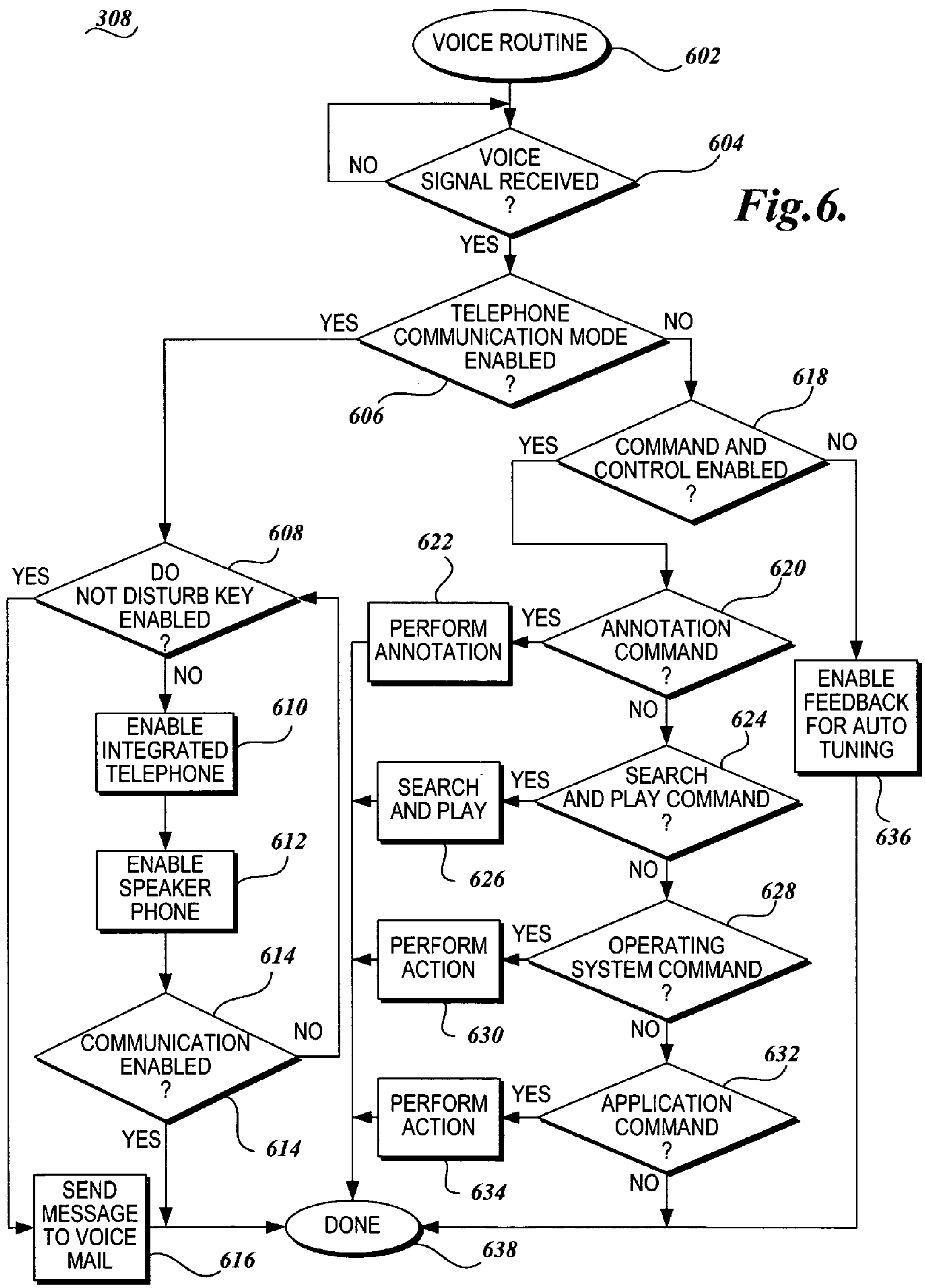
FIG. 6 is a schematic functional flow diagram of the Voice Routine for a handheld remote control device according to the present invention.

Referring now to FIG. 6, one implementation of the Voice routine 308 for the handheld remote control device 104, is illustrated. Voice routine, block 602, is initiated when a voice signal is received indicating that handheld remote control device 104 is requested to operate in a Voice routine mode, block 604. A voice signal can be anything from actuation of a button by the user, receiving an incoming telephone call from a caller, or an actual spoken command that initiates the Voice routine. If a voice signal is not received, the voice routine continues to stay in standby mode. When a voice signal is received, such as an incoming call, the Voice routine determines whether the signal is one that would enable the handheld remote control device 104 in telephone communication mode, block 606. If telephone communication mode is enabled, such as by monitoring when an incoming call is received, the Voice routine determines whether the Do-Not-Disturb function is enabled, block 608. The Do-Not-Disturb feature is desirable such as when a user is presently watching a live TV show. Notification that the Do-Not-Disturb feature is enabled can appear on the auxiliary display 112 or on the handheld remote control device display, or other user interference. If the Do-Not-Disturb function is enabled, the caller is presented with the option of leaving a message in a voice mailbox where the caller can record a message. If the caller decides to leave a message, the message is stored for later retrieval until it is accessed by the user, block 616. Alternatively, if the Do-Not-Disturb feature is not enabled, integrated telephony functionality is enabled, block 610. Such enablement of functionality can be indicated by the handheld remote control device 104 issuing an audible sign to alert the user to the incoming call, such as emitting a ringing tone similar to what a conventional phone would provide. Additionally to the audible sign, the caller ID, caller picture and other information pertaining to the caller can be displayed on the auxiliary display 112, or on the handheld remote control device interface. The user may be presented with the option of pausing and recording any current live TV show that the user may be happening to watch at the time of the call. The enabling of integrated telephony will further enable the handheld remote control device 104 as a speakerphone, block 612. Communications between the user and caller can proceed in real time, block 614. However, rather than use a conventional phone hand set, the user carries on communication using the handheld remote control device 104 that is multifunctional to function as a phone hand set and TV remote control. Confirmation that the TV show is paused and recording during live communication can appear on the auxiliary display 112 or on the handheld remote control interface. Telephone communication mode is completed when the user and caller hang up, block 638.

When the communication mode becomes disabled, the handheld remote control device 104 can return to command and control mode so that the user may return to interfacing with the Media Computing Device 102 and to watching the live TV show, or watching the portions of the show that were recorded during telephone communication mode.

Returning to block 606, when telephone communication mode is not enabled, the Voice routine determines whether Command and Control is enabled, block 618. "Command and Control" refers to a mode in the Voice routine wherein the Media Computing Device 102 is instructed to perform actions based on signals that are transmitted by the handheld remote control device 104 and are received by the Media Computing Device 102 instructing the Media Computing Device 102 to perform an action. Within Command and Control mode, several command types are possible. Representative commands include "Annotation," "Search and Play," "Operating System," and "Application" commands. Annotation relates to an instruction for the Media Computing Device 102 to attach a comment to a file, display or program to provide some more additional information than what is currently displayed. Search and Play refers to an instruction transmitted by the handheld remote control device 104 and received by the Media Computing Device 102 to look for a particular file or data, and once the file or data is located, to encode the file or data into a playable format so that the Media Computing Device 102 can play the encoded format to reproduce the audio or visual representation of the file. Operating System command refers to an instruction transmitted by the handheld remote control device 104 and received by the Media Computing Device 102 that relates to the software that controls the allocation and usage of hardware resources, such as memory, central processing unit (CPU) time, disk space, and peripheral devices. Application command refers to an instruction transmitted by the handheld remote control device 104 and received by the Media Computing Device 102 that is related to a program designed to assist in the performance of a specific task.

In Command and Control mode, the Voice routine determines whether an Annotation command is requested, block 620. If an Annotation command is requested, the Media Computing Device 102 performs the requested annotation, block 622. If an Annotation command is not requested, the Voice routine determines whether a Search and Play command is requested, block 624. If a Search and Play command is requested, the Media Computing Device 102, performs the Search and Play command, block 626. If a Search and Play command is not requested, then the Voice routine determines whether an Operating System command is requested, block 628. If an Operating System command is requested, the Media Computing Device 102 performs the requested Operating System command, block 630. If an Operating System command is not requested, the Voice routine determines whether an Application command is requested, block 632. If an Application command is requested, the Media Computing Device 102 performs the Application command, block 634. If an Application command is not requested, Command and Control mode is complete, block 638.

Returning to block 618, if neither the Telephone Communication mode or the Command and Control mode is enabled, a third mode for the handheld remote control device 104 is then enabled. The third mode of the Voice routine enables feedback for automatic tuning, block 636, and performs automatic tuning if this mode is enabled. Once the task is completed, the Feedback Tuning mode is completed, block 638.

As can be appreciated, a handheld remote control device according to the present invention is multifunctional to interface with a Media Computing Device, and is thus capable of providing control of an Entertainment Media Center and also provide communication capability in a telephony system.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for interfacing with a Media Computing Device, comprising:

determining a user of a Media Computing Device through a biometric sensor disposed on a handheld remote control device, wherein the handheld remote control device can communicate with the Media Computing Device;

initializing settings for the Media Computing Device, wherein the settings of the Media Computing Device are dependent on the user that is determined through the handheld remote control device; and enabling the user of the Media Computing Device to pause and record a TV show with the handheld remote control device when a call is received from a telephony system, wherein the telephony system is integrated with the Media Computing Device.

* * * * *

UNITED STATES PATENT AND TRADEMARK OFFICE

CERTIFICATE OF CORRECTION

PATENT NO. : 6,970,098 B1
APPLICATION NO. : 10/941302
DATED : November 29, 2005
INVENTOR(S) : Adams et al.

It is certified that error appears in the above-identified patent and that said Letters Patent is hereby corrected as shown below:

On the Title Page Item (56), under “U.S. Patent Documents”, line 1, after “5,414,773 A * 5/1995 Handelman..........” delete “348/481” and insert -- 348/461 --, therefor.

Signed and Sealed this

First Day of September, 2009

David J. Kappos
*Director of the United States Patent and Trademark Office*